US008054653B2

(12) United States Patent
Ryu et al.

(10) Patent No.: US 8,054,653 B2
(45) Date of Patent: Nov. 8, 2011

(54) DC POWER SUPPLY FOR VARYING OUTPUT VOLTAGE ACCORDING TO LOAD CURRENT VARIATION

(75) Inventors: Byoung Woo Ryu, Gyunggi-Do (KR); Chong Eun Kim, Daejeon (KR); Dong Seong Oh, Incheon (KR); Jeong Man Han, Gyunggi-Do (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 231 days.

(21) Appl. No.: 12/200,922

(22) Filed: Aug. 28, 2008

(65) Prior Publication Data

US 2009/0147553 A1  Jun. 11, 2009

(30) Foreign Application Priority Data

Dec. 7, 2007  (KR) .......................... 10-2007-0126812

(51) Int. Cl.
*H02M 3/335* (2006.01)
*H02M 1/42* (2007.01)
(52) U.S. Cl. ..................................... 363/21.02
(58) Field of Classification Search ............... 363/21.02, 363/21.03, 24, 25, 26, 16, 17, 45, 95, 131, 363/132; 323/205, 208, 209, 211, 265, 322, 323/328
See application file for complete search history.

(56) References Cited

U.S. PATENT DOCUMENTS

| 5,870,294 | A  | * | 2/1999 | Cyr ................................. 363/41 |
| 6,344,979 | B1 | * | 2/2002 | Huang et al. .................... 363/16 |
| 7,675,758 | B2 | * | 3/2010 | Artusi et al. ................ 363/21.01 |
| 2003/0042880 | A1 | | 3/2003 | Kataoka |
| 2006/0056210 | A1 | | 3/2006 | Yamada et al. |

FOREIGN PATENT DOCUMENTS

| KR | 1020010055084 A | 7/2001 |
| KR | 20050085544 A | 8/2005 |
| KR | 20030019133 A | 3/2009 |

* cited by examiner

*Primary Examiner* — Gary L Laxton
(74) *Attorney, Agent, or Firm* — Lowe, Hauptman, Ham & Berner, LLP

(57) ABSTRACT

A direct current (DC) power supply for varying an output voltage according to a load current variation is disclosed. The DC power supply includes an alternating current (AC)/DC conversion unit converting commercial AC power into DC power, a DC/DC conversion unit converting a voltage level of the DC power and outputting output power, and a control unit controlling conversion of the voltage level of the fed-back DC power according to a variation in a load current of the output power from the DC/DC conversion unit.

5 Claims, 9 Drawing Sheets

DC POWER SUPPLY FOR VARYING OUTPUT VOLTAGE ACCORDING TO LOAD CURRENT VARIATION

CROSS-REFERENCE TO RELATED APPLICATIONS

This application claims the priority of Korean Patent Application No. 2007-126812 filed on Dec. 7, 2007, in the Korean Intellectual Property Office, the disclosure of which is incorporated herein by reference.

BACKGROUND OF THE INVENTION

1. Field of the Invention

The present invention relates to direct current (DC) power supplies, and more particularly, to a DC power supply for varying an output voltage according to a load current variation.

2. Description of the Related Art

In general, an alternating current (AC)/direct current (DC) power supply is being used in a wide range of electronic products such as mobile phones, laptop computers, and display monitors.

The AC/DC power supply typically outputs a constant current and a constant voltage.

However, the AC/DC power supply must have various output characteristics because they are applied to various electronic products having various load characteristics.

Particularly, there are demands for an AC/DC power supply having an output characteristic corresponding with a load characteristic in which an output voltage increases when a load current increases, unlike a general output characteristic in which an output voltage lowers as output current increases. The general output characteristic cannot meet such demands.

SUMMARY OF THE INVENTION

An aspect of the present invention provides a DC power supply for varying an output voltage according to a load current variation.

According to an aspect of the present invention, there is provided a direct current (DC) power supply for varying an output voltage according to a load current variation, the DC power supply including: an alternating current (AC)/DC conversion unit converting commercial AC power into DC power; a DC/DC conversion unit converting a voltage level of the DC power and outputting output power; and a control unit controlling conversion of the voltage level of the fed-back DC power according to a variation in a load current of the output power from the DC/DC conversion unit.

The AC/DC conversion unit may include a filter removing electro-magnetic interference (EMI) of the commercial AC power; a rectifier rectifying and smoothing the AC power from the filter; and a power factor corrector performing power factor correction on the rectified power from the rectifier and outputting the DC power.

The control unit may control power conversion of the DC/DC conversion unit according to the variation in the load current of the output power.

The control unit may include: a current detector detecting the variation in the load current of the output power; a variable controller outputting a first control signal and a second control signal if the load current from the current detector is higher than a current level set beforehand; a first controller controlling switching of the DC/DC conversion unit according to the first control signal from the variable controller; and a second controller controlling switching of the AC/DC conversion unit according to the second control signal from the variable controller.

The variable controller may include: an operation determining block determining a control operation if the load current from the current detector is higher than a current level set beforehand; a first variation-rate determining block determining a variation rate of a voltage level of the output power according to the operation determined in the operation determining block; a first voltage setting block setting a voltage level of the output power according to the variation rate determined in the first variation-rate determining block; a first coupler coupling the voltage level from the first voltage setting block with a voltage level of the output power and sending the first control signal to the DC/DC conversion unit; a second variation-rate determining block determining a variation rate of a voltage level of the DC power according to the operation determined in the operation determining block; a second voltage setting block setting a voltage level of the DC power according to the variation rate determined in the second variation-rate determining block; and a second coupler coupling the voltage level from the second voltage setting block with a voltage level of the DC power and sending the second control signal to the AC/DC conversion unit.

The DC/DC conversion unit may convert the DC power into the output power by inductor-inductor-capacitor (LLC) resonance which occurs at an optimum resonance point set beforehand, and the control unit may maintain the optimum resonance point of the DC/DC conversion unit.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figure 1:
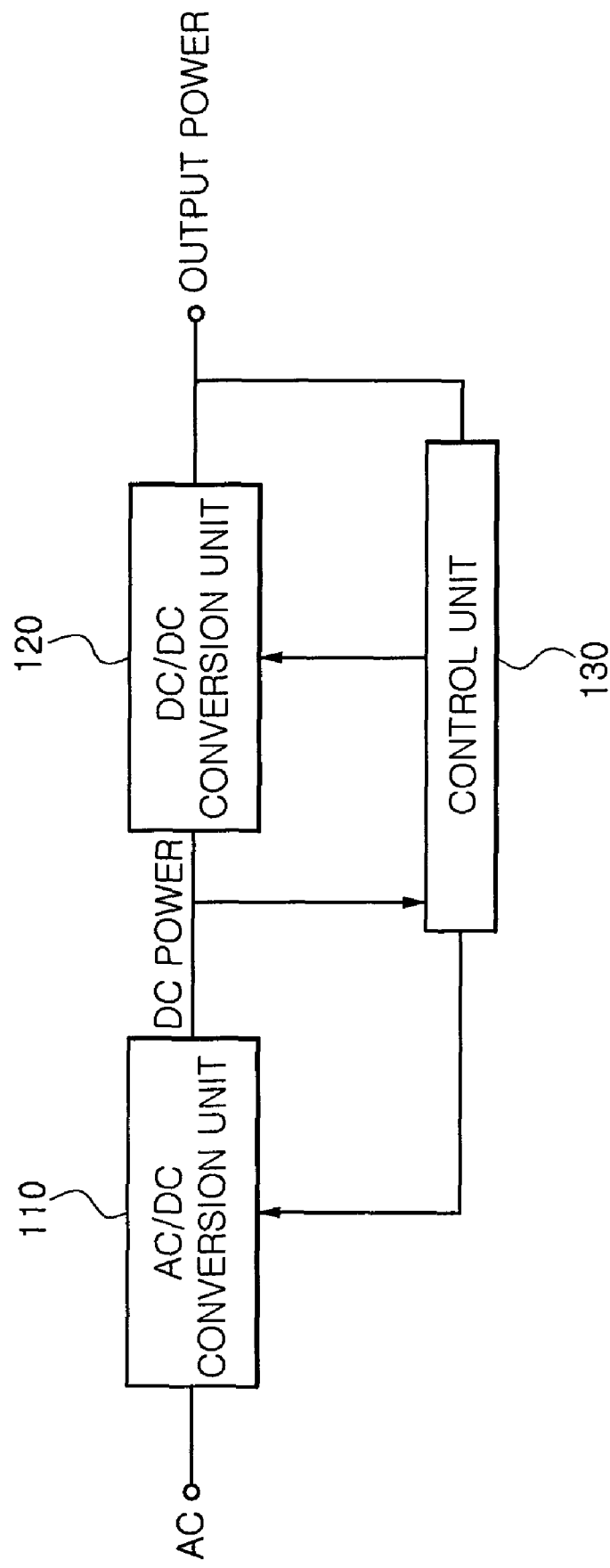
FIG. 1 is a schematic diagram of a DC power supply according to an embodiment of the present invention.

FIG. 1 is a schematic view of a direct current (DC) power supply according to an embodiment of the present invention.

Referring to FIG. 1, the DC power supply according to the embodiment of the present invention includes an alternating current (AC)/DC conversion unit 110, a DC/DC conversion unit 120, and a control unit 130.

The AC/DC conversion unit 110 converts commercial AC power into DC power by switching the commercial AC power. The DC/DC conversion unit 120 converts a voltage level of the DC power into output power by switching the DC power, and outputs the output power. The control unit 130 controls switching of the fed-back current power according to a load current variation of the output power from the DC/DC conversion unit 110, thereby varying a voltage level of the DC power.

The configuration of the DC power supply according to the embodiment of the present invention will now be described in more detail with reference to accompanying drawings.

Figure 2A:
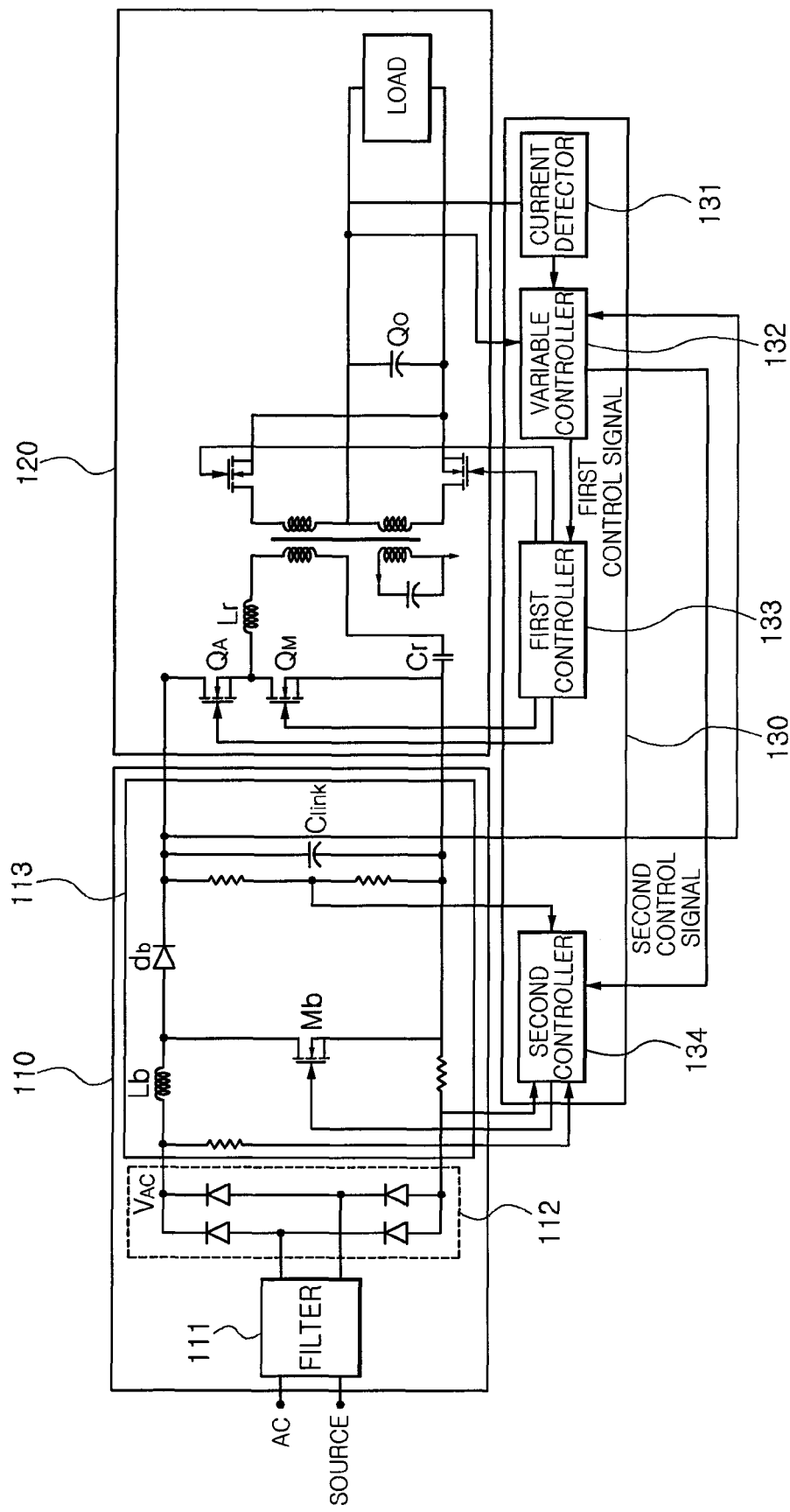
FIG. 2A is a circuit diagram of the DC power supply according to the embodiment of the present invention.
Figure 2B:
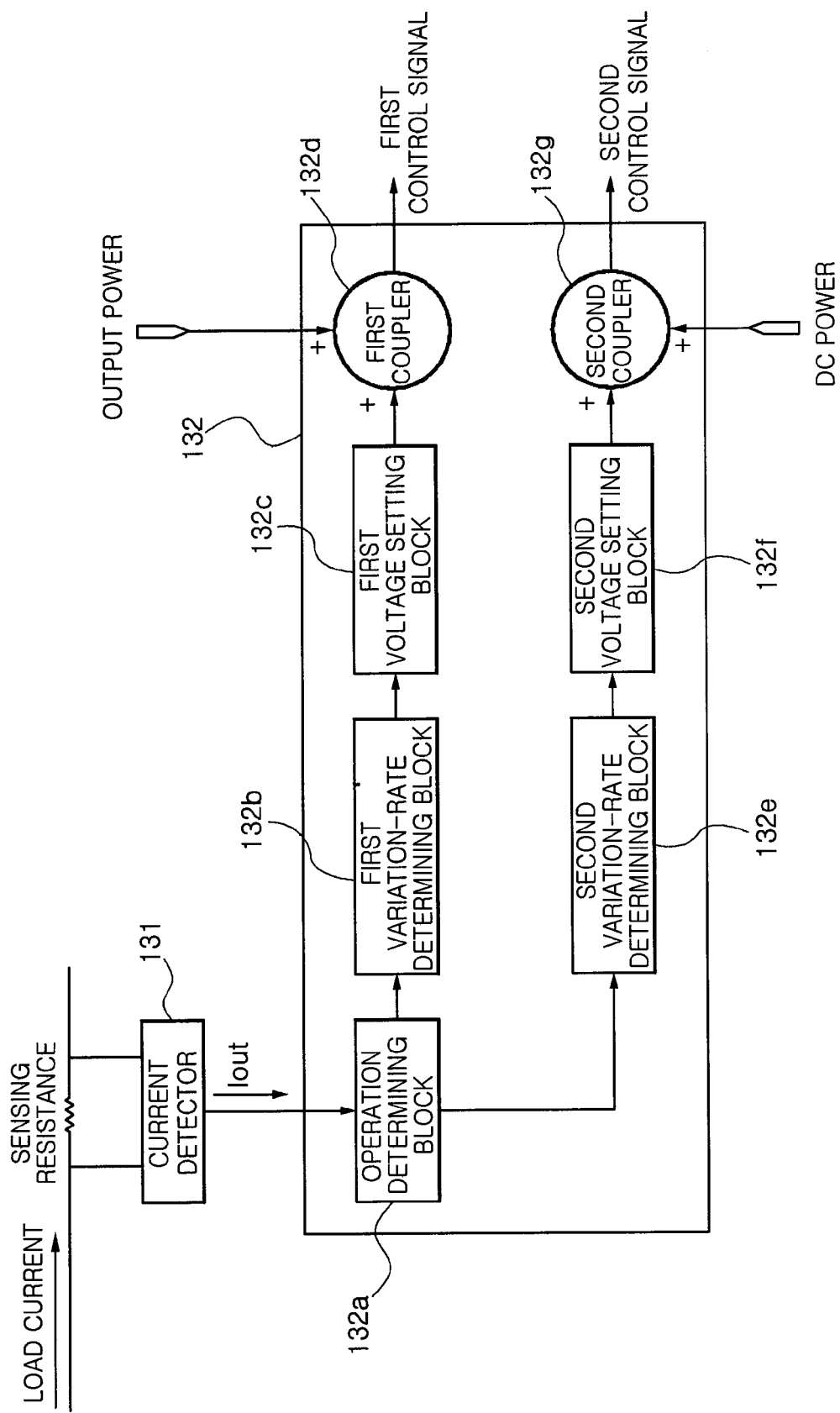
FIG. 2B is a block diagram of a variable controller used in the DC power supply according to the embodiment of the present invention.

FIG. 2A is a circuit diagram of the DC power supply according to the embodiment of the present invention, and FIG. 2B is a block diagram of a variable controller used in the DC power supply according to the embodiment of the present invention.

Referring to FIGS. 1 and 2A, the AC/DC conversion unit 110 used in the DC power supply according to the embodiment of the present invention includes a filter 111, a rectifier 112, and a power factor corrector 113. The filter 111 removes electro-magnetic interference (EMI) of the commercial AC power. The rectifier 112 rectifies and smoothes the AC power from which the EMI is removed by the filter 111. The power factor corrector 113 performs power factor correction on the rectified power from the rectifier 112 and outputs the DC power.

The DC/DC conversion unit 120 may convert the DC power to the output power by inductor-inductor-capacitor (LLC) resonance occurring at an optimum resonant point set beforehand.

The control unit 130 includes a current detector 131, a variable controller 132, a first controller 133, and a second controller 134. The current detector 131 detects a variation in a load current of the output power. The variable controller 132 operates to provide a first control signal and a second control signal when the load current from the current detector 131 is equal to or higher than a current level set beforehand. The first controller 133 controls switching of the DC/DC conversion unit 120 according to the first control signal from the variable controller 132. The second controller 134 controls switching of the power factor corrector 113 according to the second control signal from the variable controller 132.

The configuration of the control unit 130 will now be described in more detail with reference to accompanying drawings.

FIG. 2B is a block diagram of the variable controller 132 used in the DC power supply according to the embodiment of the present invention.

Referring to FIG. 2B, the variable controller 132 may include an operation determining block 132a, a first variation-rate determining block 132b, a first voltage setting block 132c, and a first coupler 132d. The operation determining block 132a determines a control operation if the load current from the current detector 131 is equal to or higher than a current level set beforehand. The first variation-rate determining block 132b determines a rate of variation in a voltage level of the output power according to the operation determined in the operation determining block 132a. The first voltage setting block 132c sets a voltage level of the output power according to the rate of variation determined in the first varia-tion-rate determining block 132b. The first coupler 132d couples the voltage level set in the first voltage setting block 132c with a voltage level of the output power to send the first controller 133 the first control signal for controlling switching of the DC/DC conversion unit 120.

The variable controller 132 may also include a second variation-rate determining block 132e, a second voltage setting block 132f, and a second coupler 132g. The second variation-rate determining block 132e determines a rate of variation in a voltage level of the DC power according to the operation determined in the operation determining block 132a. The second voltage setting block 132f sets a voltage level of the DC power according to the rate of variation determined in the second variation-rate determining block 132e. The second coupler 132g couples the voltage level set in the second voltage setting block 132f with a voltage level of the DC power to send the second controller 134 the second control signal for controlling switching of the power factor corrector 113 of the AC/DC conversion unit 110.

The power factor corrector 113 used in the AC/DC conversion unit 110 of the DC power supply according to the embodiment of the present invention will now be described with reference to accompanying drawings.

Figure 3A:
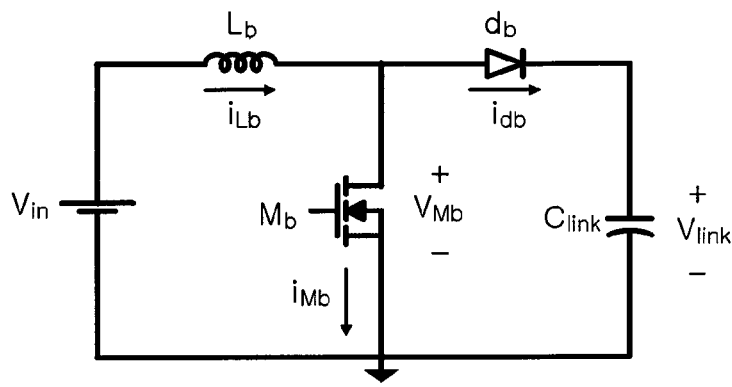
FIG. 3A is a circuit diagram of a power factor corrector used in the DC power supply according to the embodiment of the present invention.
Figure 3B:
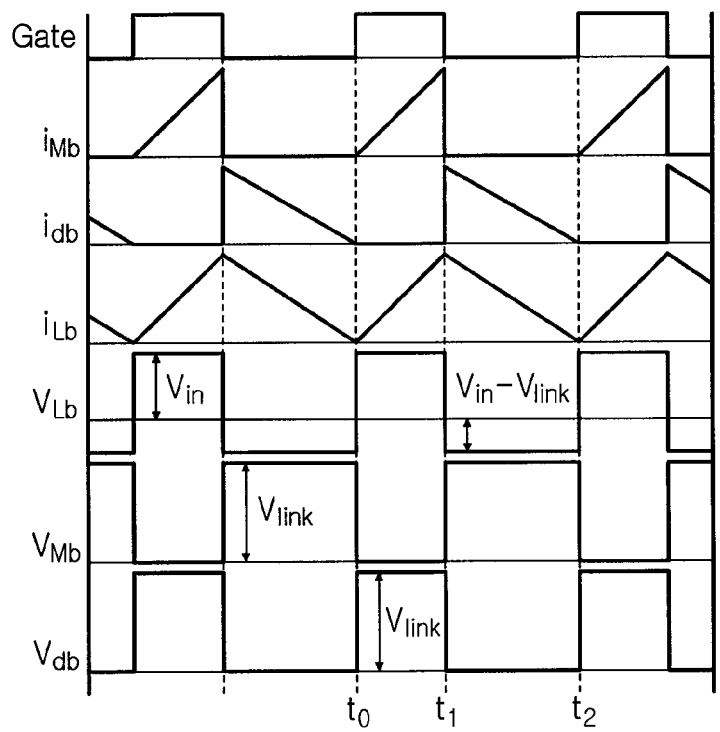
FIG. 3B is a waveform diagram illustrating the operation of the power factor corrector of FIG. 3A.
Figure 3C:
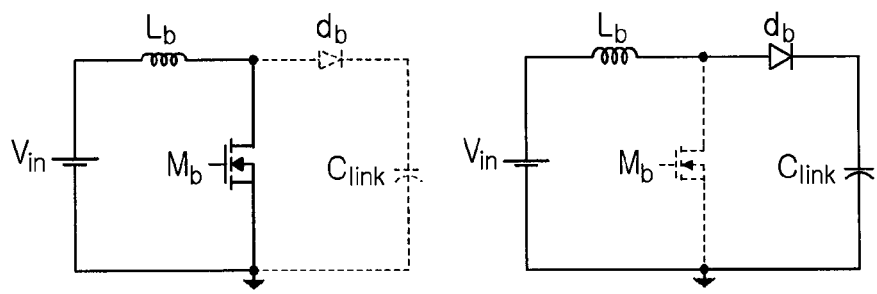
FIG. 3C is an equivalent circuit diagram for each mode.

FIG. 3A is a circuit diagram of the power factor corrector 113 of FIG. 2A used in the DC power supply according to the embodiment of the present invention. FIG. 3B is a waveform diagram illustrating the operation of the power factor corrector 113 of FIG. 2A. FIG. 3C is an equivalent circuit diagram for each mode.

Referring to FIGS. 3A and 3B, a switch $M_b$ performs switching according to a second switching control signal Gate. Thus, a current $i_{Lb}$ transmitted through an inductor $L_b$ becomes equal to the sum of a current $i_{Mb}$ transmitted to the switch $M_b$ and a current $I_{db}$ transmitted to a diode $d_b$.

Thus, a voltage $V_{Lb}$ applied to the inductor $L_b$, a voltage $V_{db}$ applied to the diode $D_b$, and a voltage $V_{Mb}$ applied to the switch $M_b$ have waveforms as shown in FIG. 3B according to a voltage level of a voltage $V_{link}$ of DC power being output and a voltage level of an input voltage $V_{in}$.

A current-voltage relation of each element will now be described in detail with reference to FIGS. 3B and 3C.

As shown in FIG. 3B, in a boosting phase from $t_0$ to $t_1$, when the switch $M_b$ is turned on, an input voltage $V_{in}$ is fully applied to the inductor $L_b$. Thus energy is accumulated in the inductor $L_b$ as expressed by Equation 1 below:

$$i_{Lb} = \frac{L_b}{V_{in}}(t - t_0) \quad (1)$$

In a powering phase from $t_1$ to $t_2$, when the switch $M_b$ is turned off, the energy accumulated in the inductor $L_b$ is transmitted to an output side through a path indicated by a solid line of a circuit diagram on the right side of FIG. 3C. At this time, the voltage $V_{Lb}$ applied to the inductor $L_b$ is as high as $V_{link} - V_{in}$, and thus the current $i_{Lb}$ flowing in the inductor $L_b$ is expressed as Equation 2 below:

$$i_{Lb} = \frac{L_b}{V_{link} - V_{in}}(t - t_1) \quad (2)$$

Duration of the boosting phase is DT, and duration of the powering phase is (1−D)T. Thus, by applying a volt-second balance to the inductor $L_b$, a conversion ratio of an input voltage to an output voltage may be expressed as Equation 3 below:

$$\frac{V_{link}}{V_{in}} = \frac{1}{1-D} \quad (3)$$

As described above, the voltage $V_{link}$ of the DC power from the power factor corrector 113 is sent to the DC/DC conversion unit 120.

Figure 4:
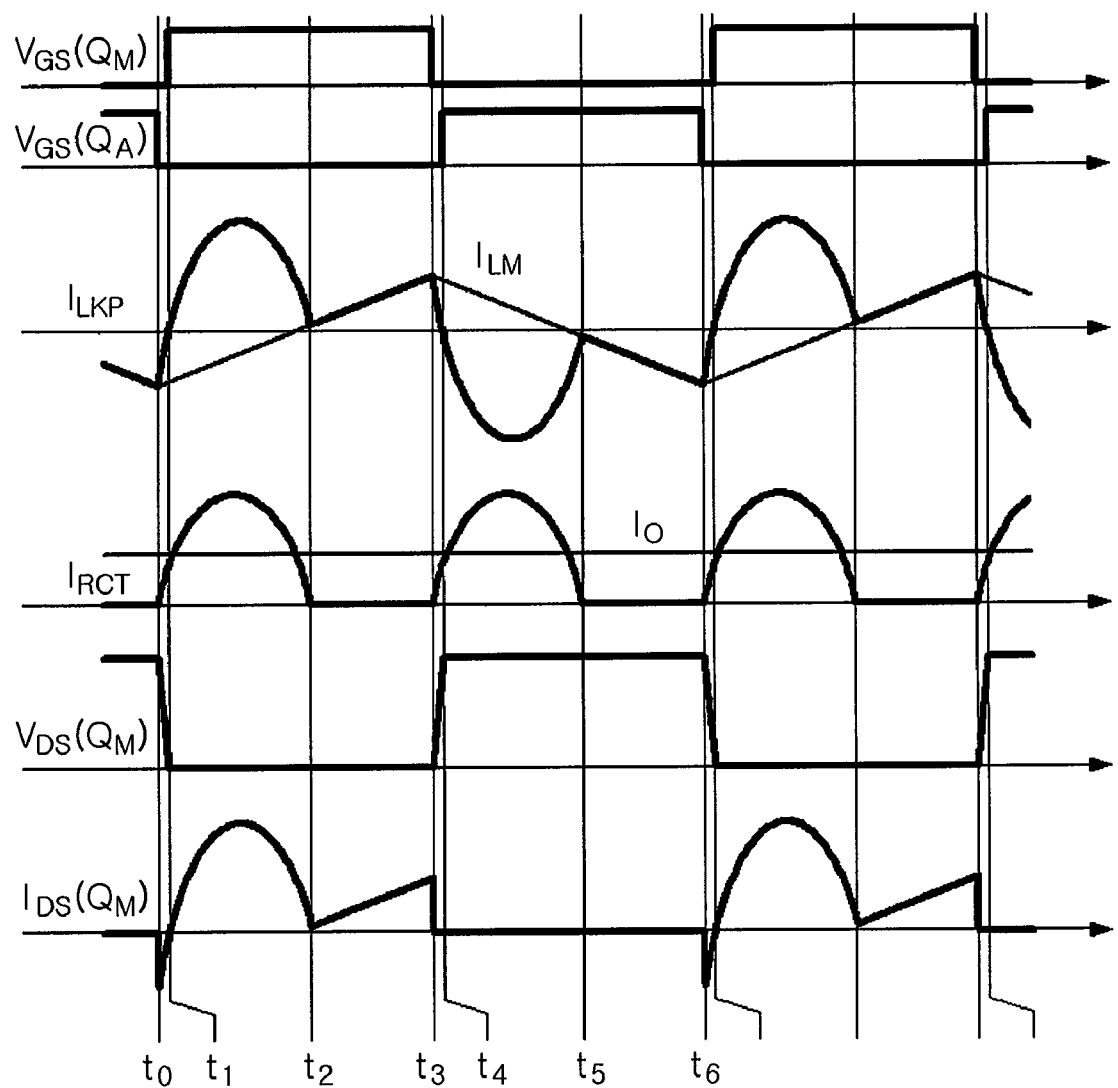
FIG. 4 is a waveform diagram illustrating the operation of a DC/DC conversion unit used in the DC power supply according to the embodiment of the present invention.

FIG. 4 is a waveform diagram illustrating the operation of the DC/DC conversion unit 120 of FIG. 1 used in the DC power supply according to the embodiment of the present invention. FIGS. 5A through 5G are circuit diagrams illustrating the operation of the DC/DC conversion unit 120 of FIG. 1 used in the DC power supply according to the embodiment of the present invention.

The DC/DC conversion unit 120 may adopt LLC resonance caused by inductors $L_{KP}$ and $L_M$ and a capacitor $C_H$ included in the DC/DC conversion unit 120. The operation of the DC/DC conversion unit 120 may be divided into six stages according to switching states of switches $Q_A$ and $Q_M$ which are metal oxide semiconductor field effect transistors (MOSFET) of a primary side, and switching states of diodes D1 to D4 of a secondary side (hereinafter, also referred to as secondary-side diodes).

Before time $t_0$, the switch $Q_M$ is in an OFF state, and the switch $Q_A$ is in an ON state. Thus, before the time $t_0$, current does not flow in the secondary side, and a negative magnetizing current of a transformer is flowing through the switch $Q_A$.

The operation will now be described with reference to FIGS. 4 and 5A through 5G. First, a first operation stage from $t_0$ to $t_1$ is initiated by turning off the switch $Q_A$ at time $t_0$. A current path during the first operation stage is indicated by a thicker solid line of FIG. 5A. Since the magnetizing current of the transformer has a negative value, it flows through a reverse parallel diode of the switch $Q_M$. A voltage as high as $V_S-V_H$ is applied to the primary side of the transformer. Because the voltage as high as $V_S-V_H$ is higher than $(N_P/N_S)V_0$, the secondary-side diodes $D_1$ and $D_2$ are turned on. Simultaneously, a capacitor $C_H$ of the primary side (hereinafter, also referred to as a primary-side capacitor) and an inductor $L_{KP}$ of the primary side (hereinafter, also referred to as a primary-side capacitor) begin to resonate with each other, and a voltage as high as $(N_P/N_S)V_0$ is applied to a magnetizing inductor $L_M$ of the transformer, so that the magnetizing current linearly increases.

A second operation stage from $t_1$ to $t_2$ is initiated at a zero point of a current $I_{LKP}$ of the primary-side inductor $L_{KP}$ (hereinafter, also referred to as a primary-side inductor current) by turning on the switch $Q_M$ at time $t_1$. In the second operation stage, the current $I_{LKP}$ of the primary-side inductor $L_{KP}$ is higher than zero. The current path during the second operation stage is indicated by a thicker solid line of FIG. 5B. The current $I_{LKP}$ of the primary-side inductor $L_{KP}$ flows through the switch $Q_M$, and the main operation in the second operation stage is similar to that in the first operation stage.

A third operation stage from $t_2$ to $t_3$ is initiated as the primary-side inductor current $i_{LKP}$ becomes equal to a magnetizing inductor current $i_{LM}$ because of the resonance between the primary-side capacitor $C_H$ and the primary-side inductor $L_{KP}$. The current path during the third operation stage is indicated by a thicker solid line of FIG. 5C. When the primary-side inductor current $I_{LKP}$ becomes equal to the magnetizing inductor current $i_{LM}$, the current does not flow toward the secondary side of the transformer, so that the secondary-side diodes $D_1$ and $D_2$ are turned off. Thus, the voltage as high as $V_S-V_H$ is mostly applied to the magnetizing inductor $L_M$, and increases as the primary-side inductor $L_{KP}$, the magnetizing inductor $L_M$ and the primary-side capacitor $C_H$ resonate with one another in a state where the primary-side inductor current $I_{LKP}$ is equal to the magnetizing inductor current $i_{LM}$.

A fourth operation stage from $t_3$ to $t_4$ is initiated by turning off the switch $Q_M$ at time $t_3$. The current path of the fourth operation stage is indicated by a thicker solid line of FIG. 5D. Since the magnetizing current of the transformer has a positive value, it flows through a reverse parallel diode of the switch $Q_A$. A voltage as high as $-V_H$ is applied to the primary side of the transformer, and is lower than $-(N_P/N_S)V_0$, so that the secondary-side diodes $D_3$ and $D_4$ are turned on. Simultaneously, the primary-side capacitor $C_H$ and the primary-side inductor $L_{KP}$ begin to resonate with each other, and a voltage as high as $-(N_P/N_S)V_0$ is applied to the magnetizing inductor $L_M$ of the transformer, so that the magnetizing current linearly decreases.

A fifth operation stage from $t_4$ to $t_5$ is initiated at a zero point of the current $I_{LKP}$ of the primary-side inductor $L_{KP}$ by turning on the switch $Q_A$ at time $t_4$. In the fifth operation stage, the current $I_{LKP}$ of the primary-side inductor $L_{KP}$ is lower than zero. The current path during the fifth operation stage is indicated by a thicker sold line of FIG. 5E. The current $I_{LKP}$ of the primary-side inductor $L_{KP}$ flows through the switch $Q_A$, and the main operation in the fifth operation stage is similar to that in the fourth operation stage.

A sixth operation stage from $t_5$ to $t_6$ is initiated as the primary-side inductor current $i_{LKP}$ becomes equal to the magnetizing inductor current $i_{LM}$ because of resonance between the primary-side capacitor $C_H$ and the primary-side inductor $L_{KP}$. The current path during the sixth operation stage is indicated by a thicker solid line of FIG. 5F. When the primary-side inductor current $i_{LKP}$ becomes equal to the magnetizing inductor current $i_{LM}$, the current does not flow toward the secondary side of the transformer, so that the secondary-side diodes $D_3$ and $D_4$ are turned off. Thus the voltage as high as $-V_H$ is mostly applied to the magnetizing inductor $L_M$, and decreases as the primary-side inductor $L_{KP}$, the magnetizing inductor $L_M$ and the primary-side capacitor $C_H$ resonate with one another in a state where the primary-side inductor current $I_{LKP}$ is equal to the magnetizing inductor current $i_{LM}$.

Figure 5A:
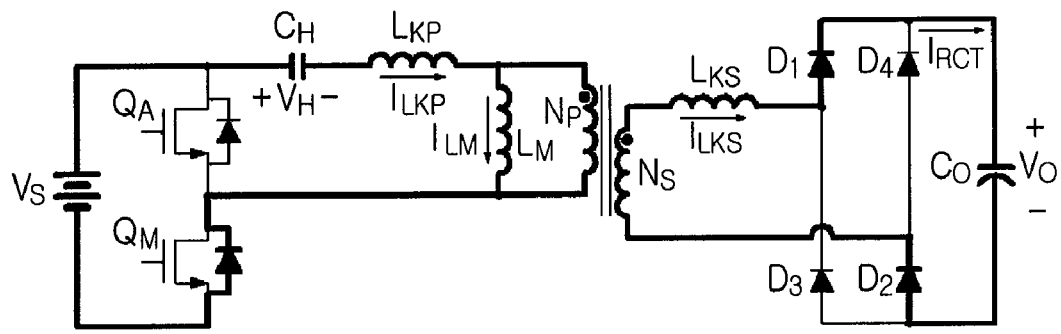
FIGS. 5A through 5G are circuit diagrams illustrating the operation of the DC/DC conversion unit used in the DC power supply according to the embodiment of the present invention.
Figure 5B:
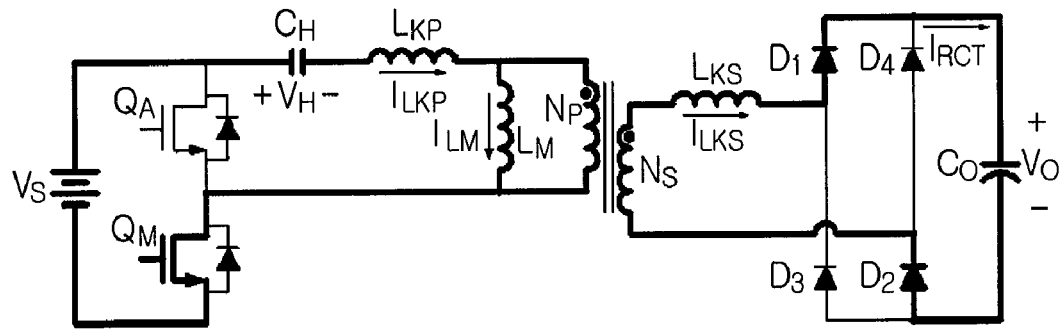
Figure 5C:
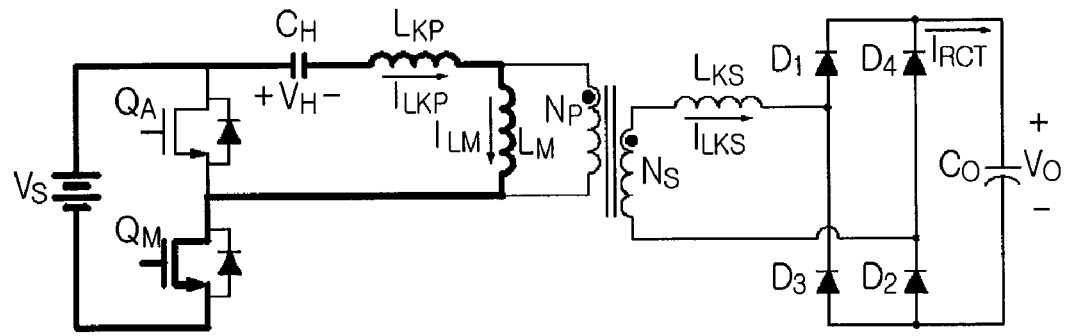
Figure 5D:
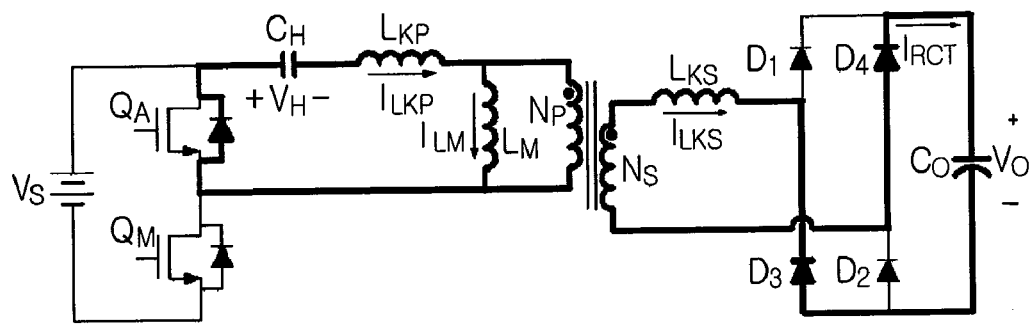
Figure 5E:
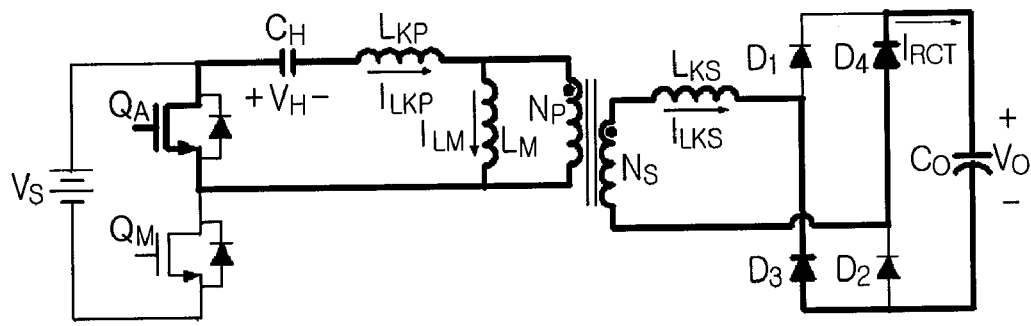
Figure 5F:
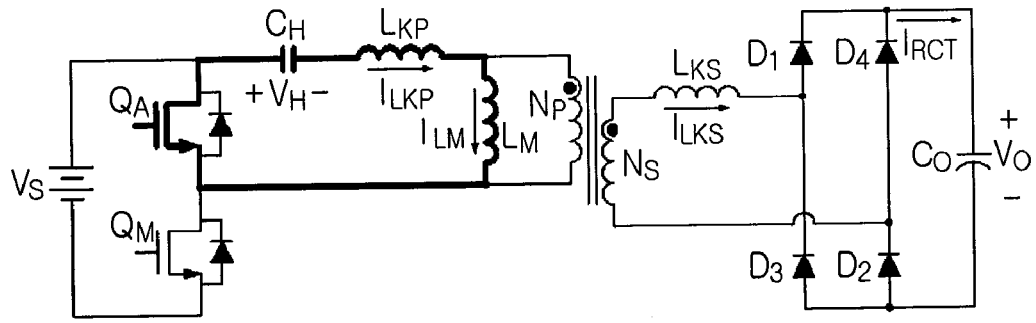
Figure 5G:
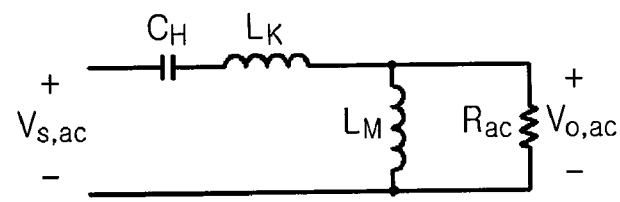

The DC/DC conversion unit 120 used in the DC power supply according to the embodiment of the present invention may be represented by an approximated equivalent circuit as shown in FIG. 5G. That is, since an input side switches the DC power from the AC/DC conversion unit 110 and an output side switches the DC power from the transformer, the DC power from the input side and the DC power from the output side may be respectively converted into AC voltages by Equations 4 and 5 below:

$$V_{S,ac} = \frac{\sqrt{2}}{\pi} V_S \quad (4)$$

$$V_{O,ac} = \frac{2\sqrt{2}}{\pi} V_O \quad (5)$$

Also, using a transformation equation of an output voltage, output load resistance may be expressed by Equation 6 below:

$$R_{ac} = \frac{8n^2}{\pi^2} R_O \quad (6)$$

Using a Fourier-transformed impedance value, an input/output equation of the equivalent circuit of FIG. 5G may be expressed by Equation 7 below $$G_{ac} = \frac{V_{O,ac}}{V_{S,ac}} = \frac{R_{ac} \| j\omega L_M}{j\omega L_K + \dfrac{1}{j\omega C_H} + R_{ac} \| j\omega L_M} \quad (7)$$

By taking an absolute value in Equation 7 to obtain the magnitude of the input/output equation converted into AC, Equation 8 below can be obtained, and respective parameters are expressed by Equations 9 through 11 below:

$$|G_{ac}| = \frac{1}{\sqrt{\left\{1 + \dfrac{1}{k}\left[1 - \left(\dfrac{F_R}{F_S}\right)^2\right]\right\}^2 + \left[\left(\dfrac{F_S}{F_R} - \dfrac{F_R}{F_S}\right)\dfrac{\pi^2}{8n^2}Q\right]^2}} \quad (8)$$

$$F_R = \frac{1}{2\pi\sqrt{L_k C_H}} \quad (9)$$

$$Q = \sqrt{\frac{L_K}{C_H}} \frac{1}{R_C} \quad (10)$$

$$K = \frac{L_M}{L_K} \quad (11)$$

Finally, the input/output voltage conversion ratio of the DC/DC conversion unit 120 used in the DC power supply according to the embodiment of the present invention is induced as Equation 12 below by Equations 4, 5 and 8 above.

$$\begin{aligned}
G_{DC} &= \frac{V_O}{V_S} \\
&= \frac{1}{2n}|G_{ac}| \\
&= \frac{1}{2n\sqrt{\left\{1 + \dfrac{1}{K}\left[1 - \left(\dfrac{F_R}{F_S}\right)^2\right]\right\}^2 + \left[\left(\dfrac{F_s}{F_R} - \dfrac{F_R}{F_S}\right)\dfrac{\pi^2}{8n^2}\sqrt{\dfrac{L_K}{C_H}}\dfrac{1}{R_O}\right]^2}}
\end{aligned} \quad (12)$$

In general, a power conversion circuit adopting a resonance conversion method varies a resonant frequency as an output voltage varies according to a load being used, in order to variously implement an output voltage. However, because of a wide range of frequency variation, a related art control method has limitations such as difficulties in regulation and low efficiency.

According to the embodiment of the present invention, to overcome such limitations, the range of frequency variation is reduced by varying an output voltage of the power factor corrector 113 according to a load. Accordingly, the regulation is facilitated, and the efficiency is improved by maintaining an optimum resonance point.

Figure 6:
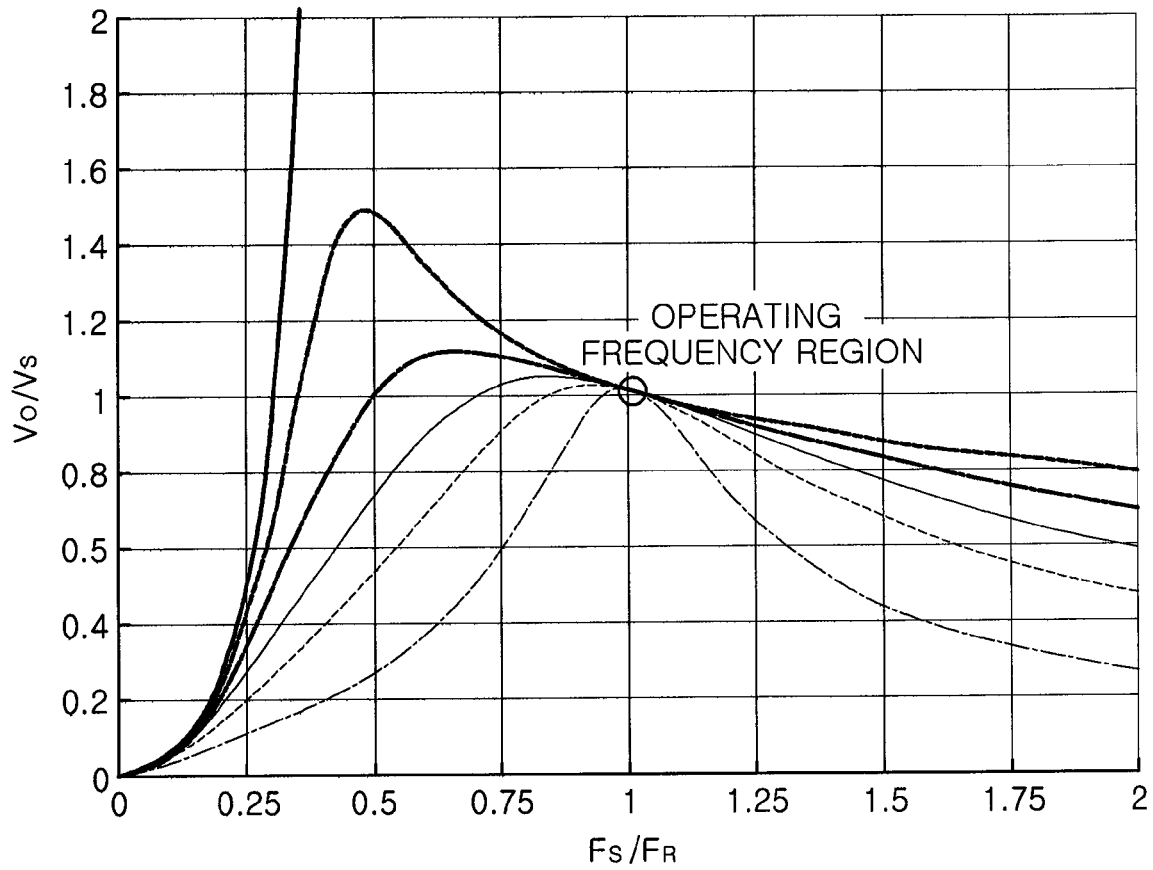
FIG. 6 is a resonant frequency graph of the DC/DC conversion unit used in the DC power supply according to the embodiment of the present invention.

FIG. 6 is a resonant frequency graph of the DC/DC conversion unit 120 of FIG. 1 used in the DC power supply according to the embodiment of the present invention.

As described above, it can be seen that the DC/DC conversion unit 120 used in the DC power supply according to the embodiment of the present invention maintains the optimum resonance point although the output voltage is varied according to a load.

Figure 7:
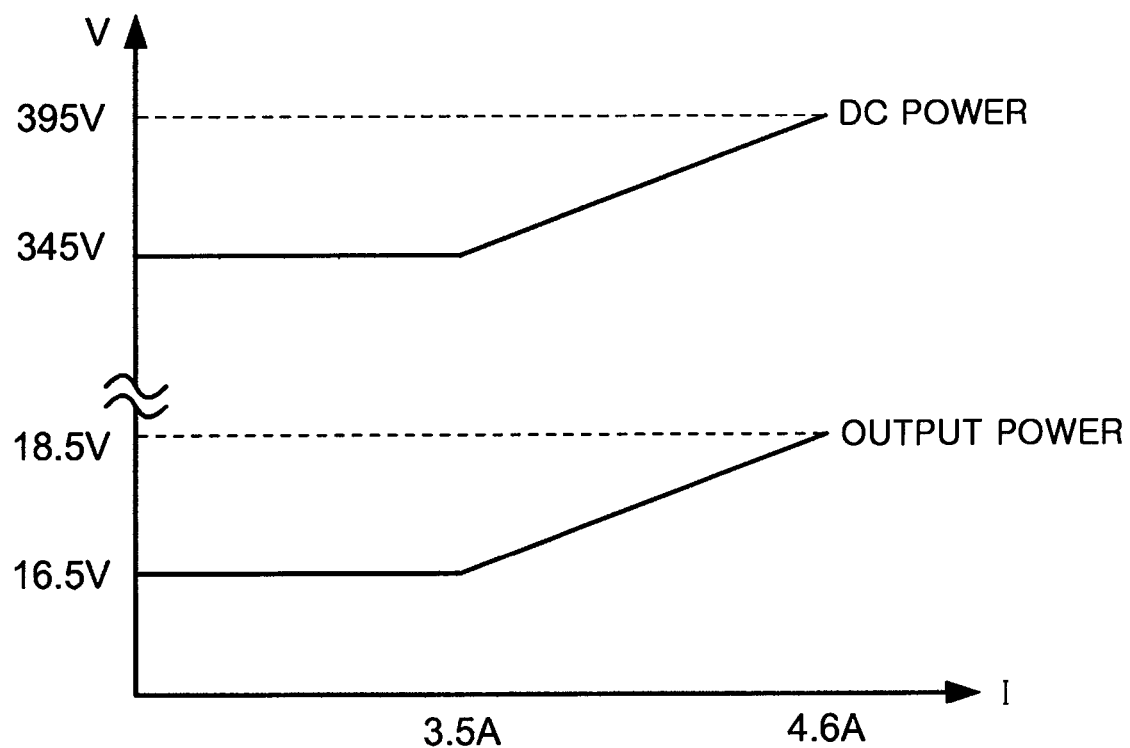
FIG. 7 is a graph showing DC power and output power of the DC power supply according to the embodiment of the present invention.

FIG. 7 is a graph illustrating DC power and output power of the DC power supply according to the embodiment of the present invention.

A user may demand that an output voltage be varied according to a load current variation. That is, it may be demanded that an output voltage is maintained at 16.5 V when the load current falls within a range from 0 A to 3.5 A, and the output voltage linearly changes from 16.5 V to 18.5 V when the load current falls within a range from 3.5 A and to 4.6 A. Thus, the DC power supply according to the embodiment of the present invention detects a load current, and increases a voltage of DC power of the power factor corrector 113 within a range from 345 V to 395 V and also increases a voltage of output power of the DC/DC conversion unit 120 within a range from 16.5 V to 18.5 V if the detected load current is higher than 3.5 A. Accordingly, the user demand can be satisfied and the optimum resonance point is maintained, thereby maintaining optimum efficiency.

According to the embodiment of the present invention, an output voltage is varied according to a load current variation, thereby implementing an output characteristic in which the output voltage increases although the load current increases.

While the present invention has been shown and described in connection with the exemplary embodiments, it will be apparent to those skilled in the art that modifications and variations can be made without departing from the spirit and scope of the invention as defined by the appended claims.

What is claimed is:

1. A direct current (DC) power supply comprising:
   an alternating current (AC)/DC conversion unit for converting AC power into DC power;
   a DC/DC conversion unit for converting the DC power into output power; and
   a control unit for controlling conversion of the AC/DC conversion unit and conversion of the DC/DC conversion unit, according to a variation in a load current of the output power from the DC/DC conversion unit,
   wherein the DC/DC conversion unit is configured to convert the DC power into the output power by inductor-inductor-capacitor (LLC) resonance, which occurs at a preset optimum resonance point, and
   wherein the control unit is configured to maintain the preset optimum resonance point of the DC/DC conversion unit by increasing a voltage level of the DC power from the AC/DC conversion unit, when increasing the load current and a voltage level of the output power.

2. The DC power supply of claim 1, wherein the AC/DC conversion unit comprises:
   a filter for removing electro-magnetic interference (EMI) of the AC power;
   a rectifier for rectifying and smoothing the AC power from the filter; and
   a power factor corrector for performing power factor correction on the rectified power from the rectifier and outputting the DC power.

3. The DC power supply of claim 2, wherein the control unit comprises:
   a current detector for detecting the variation in the load current of the output power;
   a variable controller for outputting a first control signal and a second control signal if the load current from the current detector is higher than a preset current level;

a first controller for controlling switching of the DC/DC conversion unit according to the first control signal from the variable controller; and a second controller for controlling switching of the AC/DC conversion unit according to the second control signal from the variable controller.

4. The DC power supply of claim 3, wherein the variable controller comprises:

an operation determining block for determining a control operation if the load current from the current detector is higher than the preset current level;

a first variation-rate determining block for determining a variation rate of the voltage level of the output power according to the operation determined in the operation determining block;

a first voltage setting block for setting the voltage level of the output power according to the variation rate determined in the first variation-rate determining block;

a first coupler for coupling the voltage level from the first voltage setting block with the voltage level of the output power, and sending the first control signal based on a coupling result of the first coupler to the DC/DC conversion unit;

a second variation-rate determining block for determining a variation rate of a voltage level of the DC power according to the operation determined in the operation determining block;

a second voltage setting block for setting the voltage level of the DC power according to the variation rate determined in the second variation-rate determining block; and a second coupler for coupling the voltage level from the second voltage setting block with the voltage level of the DC power, and sending the second control signal based on a coupling result of the second coupler to the AC/DC conversion unit.

5. The DC power supply of claim 1, wherein the control unit is configured to vary the voltage level of the output power from the DC/DC conversion unit according to the variation of the load current.

* * * * *